United States Patent
Nishii et al.

(10) Patent No.: US 6,296,324 B1
(45) Date of Patent: Oct. 2, 2001

(54) BRAKE FLUID PRESSURE GENERATING DEVICE FOR A VEHICLE

(75) Inventors: Michiharu Nishii; Masaki Oishi, both of Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/275,390

(22) Filed: Mar. 24, 1999

(30) Foreign Application Priority Data

Mar. 24, 1998 (JP) .................................................. 10-075814

(51) Int. Cl.⁷ .................................................. B60T 13/122
(52) U.S. Cl. .................................. 303/11; 60/591; 60/592
(58) Field of Search .................................. 188/358, 359; 303/9, 10, 11, 114.1, 113.4; 60/556, 562, 56, 547.1, 591, 592

(56) References Cited

U.S. PATENT DOCUMENTS

| | | | |
|---|---|---|---|
| 4,025,123 | * | 5/1977 | Oberthuer ............................. 303/6 R |
| 4,421,212 | * | 12/1983 | Fleck ..................................... 188/152 |
| 4,659,152 | * | 4/1987 | Reinartz et al. ...................... 303/114 |
| 4,703,978 | * | 11/1987 | Belart et al. ........................... 303/52 |
| 4,887,869 | * | 12/1989 | Nishii et al. .......................... 303/114 |
| 5,027,599 | * | 7/1991 | Nishii et al. .......................... 60/547.1 |
| 5,029,951 | * | 7/1991 | Nishii ................................... 303/114 |
| 5,052,182 | * | 10/1991 | Nishii et al. .......................... 60/547.1 |
| 5,081,841 | * | 1/1992 | Nishii ....................................... 60/56 |
| 5,515,678 | * | 5/1996 | Kurokawa et al. ...................... 60/591 |
| 5,634,338 | * | 6/1997 | Matsuda et al. ......................... 60/556 |
| 5,851,057 | * | 12/1998 | Terazawa et al. ...................... 303/155 |
| 5,897,175 | * | 4/1999 | Terazawa et al. ................... 303/113.4 |
| 5,899,068 | * | 5/1999 | Nishii et al. ............................ 60/562 |
| 5,924,530 | * | 7/1999 | Nishii et al. .......................... 188/358 |
| 5,927,074 | * | 7/1999 | Nishii et al. ............................ 60/591 |
| 6,062,655 | * | 5/2000 | Nishii et al. ........................ 303/113.4 |
| 6,089,676 | * | 7/2000 | Nishii et al. ............................ 303/11 |

FOREIGN PATENT DOCUMENTS

| | | | |
|---|---|---|---|
| 2313637 | * | 12/1997 | (GB) . |
| 5193480 | * | 8/1993 | (JP) . |
| 9315286 | * | 12/1997 | (JP) . |
| 9-315288 | | 12/1997 | (JP) . |

* cited by examiner

Primary Examiner—Robert J. Oberleitner
Assistant Examiner—Melody M. Burch
(74) Attorney, Agent, or Firm—Burns, Doane, Swecker & Mathis, LLP

(57) ABSTRACT

A brake fluid pressure generating device includes a master cylinder piston slidably disposed in a cylinder body, a pressure chamber and a power chamber formed in the cylinder body, a master cylinder that generates a master cylinder fluid pressure in response to operation of a brake pedal, a supplemental fluid generator that generates a power fluid pressure, a fluid regulator that regulates the power fluid pressure to a regulator fluid pressure in response to operation of the brake pedal, a pressure increase valve that controls communication between the supplemental fluid generator and the power chamber, and a pressure release valve that controls communication between the power chamber and a reservoir tank. A valve operating force generating member controls the pressure increase valve and the pressure release valve, a first repulsion force generating member is controlled in response to the regulator fluid pressure and a second repulsion force generating member is controlled in response to the master cylinder fluid pressure. This invention generates a larger magnitude of regulator pressure under the condition that the master cylinder is in a disabled condition.

10 Claims, 4 Drawing Sheets

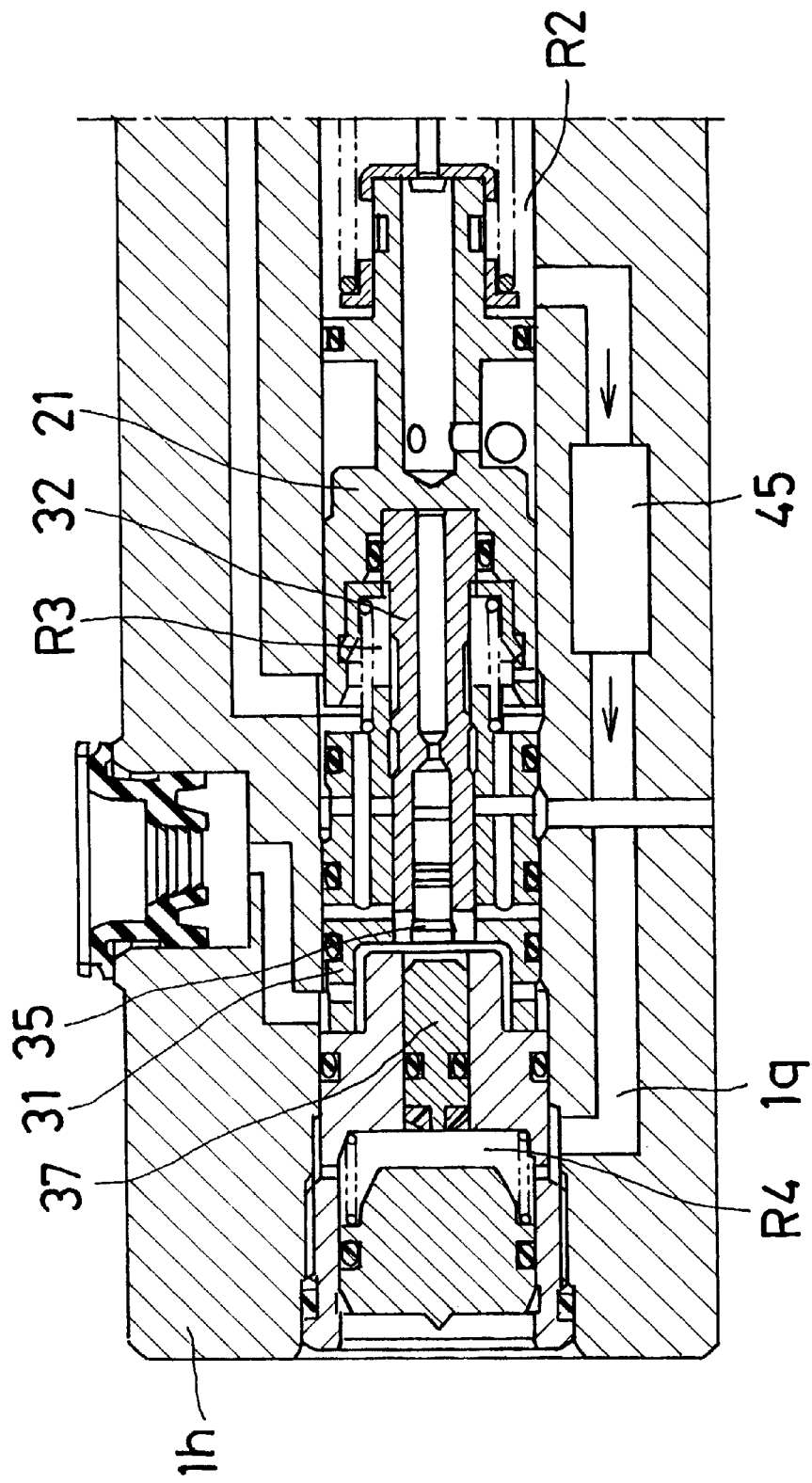

BRAKE FLUID PRESSURE GENERATING DEVICE FOR A VEHICLE

This application is based on and claims priority under 35 U.S.C. § 119 with respect to Japanese Application No. 10(1998)-75814 filed on Mar. 24, 1998, the entire content of which is incorporated herein by reference.

FIELD OF THE INVENTION

This invention generally relates to a vehicle brake fluid operating system. More particularly, the present invention pertains to a vehicle brake fluid pressure generating device.

BACKGROUND OF THE INVENTION

A known type of brake fluid pressure generating device is disclosed in, for example, Japanese Patent Laid-Open Publication No. 9-315288. In this known brake pressure generating device, a master cylinder piston has a first master cylinder piston, a second master cylinder piston and an engage member. The first master cylinder piston and the second master cylinder piston are slidable relative to each other. When the second master cylinder piston moves toward the first master cylinder piston, the engage member engages the first master cylinder piston. One end of each of the first and the second master cylinder pistons is accommodated in a power chamber. The other ends of the first and second master cylinder pistons are accommodated in a pressure chamber. When a power fluid pressure that is generated by the supplemental fluid pressure source is sufficient, the master cylinder is driven by the regulator fluid pressure in response to the depression of a brake pedal. When a power fluid pressure that is generated by the supplemental fluid pressure source is not sufficient, the master cylinder is driven in a normal manner in response to the depression of the brake pedal. Instead of this condition, the master cylinder generates an appropriate fluid pressure.

However, this known brake fluid pressure generating device suffers from the following drawbacks and disadvantages. If the brake fluid pressure generating device experiences problems with respect to the master cylinder, the magnitude of the regulator pressure typically does not change as a result of operation of the brake pedal. As a result, the braking force that is generated by the wheel cylinders decreases.

A need thus exists for a brake pressure generating device that is able to generate a bigger magnitude regulator pressure when the master cylinder is in a disabled condition.

SUMMARY OF THE INVENTION

The present invention provides a brake fluid pressure generating device that includes a master cylinder piston slidably disposed in a cylinder body, a pressure chamber and a power chamber formed in the cylinder body, a master cylinder that generates a master cylinder fluid pressure in response to operation of a brake pedal, a supplemental fluid generator that generates a power fluid pressure, a fluid regulator that regulates the power fluid pressure to a regulator fluid pressure in response to operation of the brake pedal, a pressure increase valve that controls communication between the supplemental fluid generator and the power chamber, and a pressure release valve that controls communication between the power chamber and a reservoir tank. A valve operating force generating member controls the pressure increase valve and the pressure release valve, a first repulsion force generating member is controlled in response to the regulator fluid pressure and a second repulsion force generating member is controlled in response to the master cylinder fluid pressure.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 4 is a cross-sectional view of a portion of the brake fluid pressure generating device according to another embodiment of the present invention illustrating the fluid regulator.

DETAILED DESCRIPTION OF THE PREFERRED EMBODIMENTS

Figure 1:
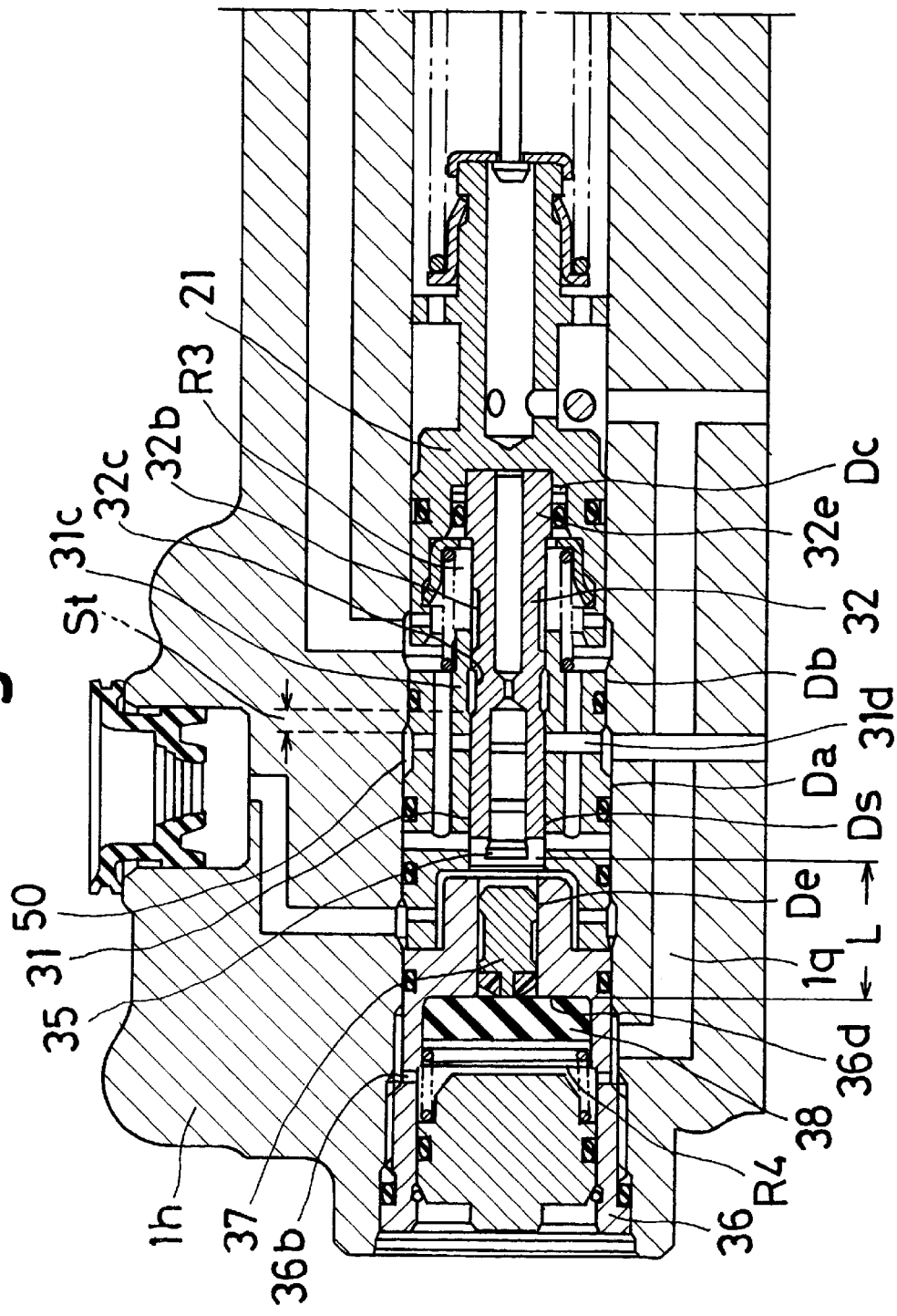
FIG. 1 is a cross-sectional view of a portion of the brake fluid pressure generating device of the present invention illustrating the fluid regulator.
Figure 2:
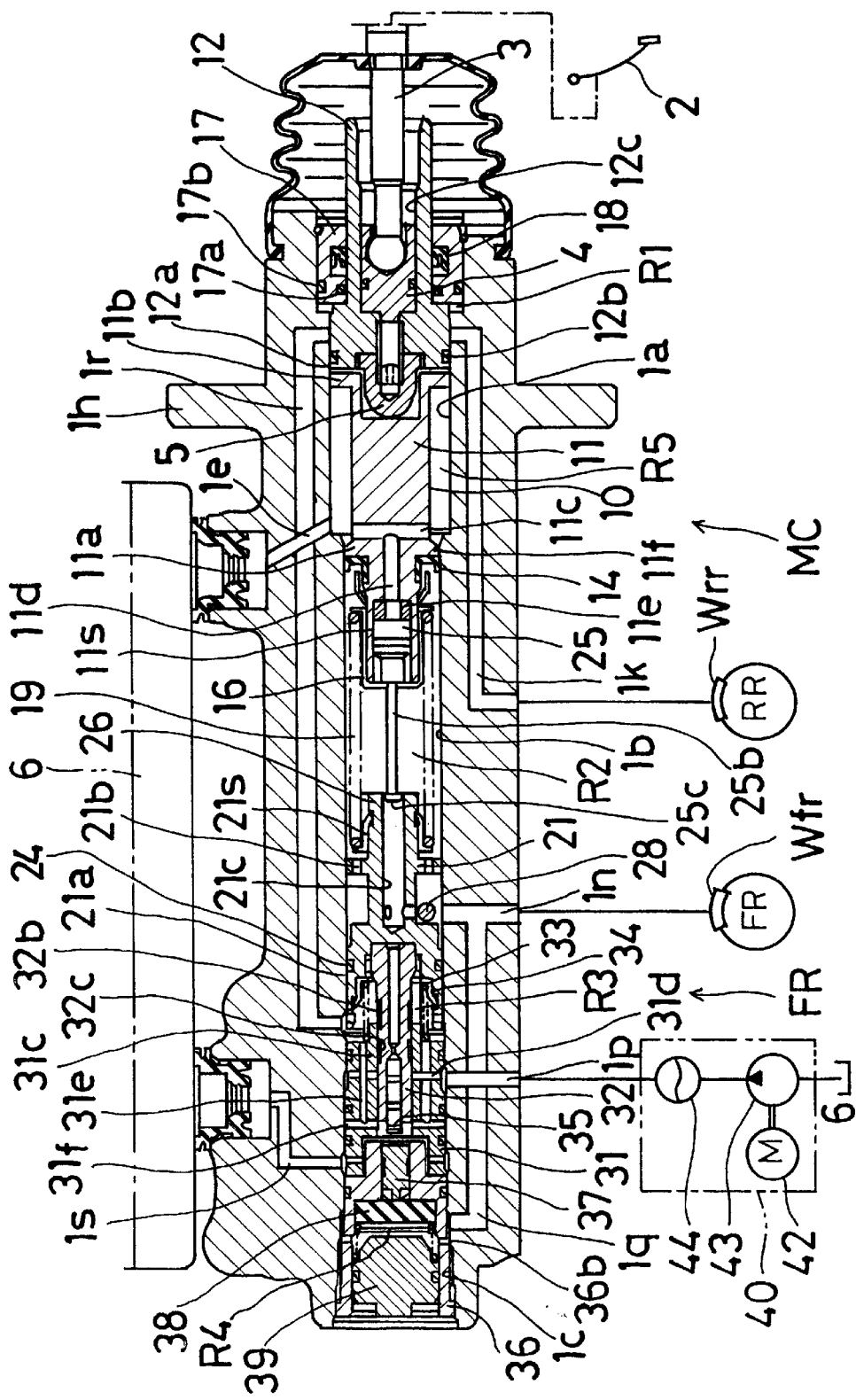
FIG. 2 is a cross-sectional view of the brake fluid pressure generating device shown in FIG. 1.

Referring to FIGS. 1 and 2, the brake fluid pressure generating device includes a fluid regulator arranged in the left side of a cylinder body $1h$ and a master cylinder arranged in the right side of the cylinder body $1h$. In this embodiment, the left side represents the direction of forward movement of the vehicle while the right side represent the direction of reverse movement of the vehicle. A brake pedal 2 is operatively connected to the master cylinder MC so that the force applied to the brake pedal 2 is transmitted to a push rod 3 and an input member 4 as a brake operating force. In response to this brake operating force, the fluid pressure generated by the master cylinder MC and the fluid regulator FR is supplied to the wheel cylinders that are operatively associated with each of the vehicle wheels. In FIG. 2, only the front right side wheel cylinder Wfr and the rear right side wheel cylinder Wrr are illustrated, it being understood that the system also includes a front left side wheel cylinder and a rear left side wheel cylinder. The front right side wheel cylinder Wfr and the rear left side wheel cylinder belong to a first fluid circuit, and the front left side wheel cylinder and the rear right side wheel cylinder Wrr belong to a second fluid circuit.

A step-shaped bore defined by several bore sections $1a$, $1b$, $1c$ is formed inside the cylinder body $1h$, with each bore section $1a$, $1b$, $1c$ having a different diameter. A master cylinder piston 10 and a control piston 21 are arranged in the cylinder body $1h$. The control piston 21 functions as a valve operating force generating member and a repulsion force generating member. A pressure chamber R2 is formed between the master cylinder piston 10 and the control piston 21. The first bore section $1a$ communicates with a power chamber R1 that has a larger diameter as compared to the first bore section $1a$. The control piston 21 is slidably disposed in a fluid tight manner in the second bore section $1b$ that has the smallest diameter.

The master cylinder piston 10 is comprised of a first piston 11 and a second piston 12, with one end of the first piston 11 being supported within the second bore section 1b and the other end of the first piston 11 being supported in the first bore section 1a. A first land 11a is provided on the outer surface at one end of the first piston 11 and is supported within the second bore section 1b, and a second land 11b is provided on the outer surface at the opposite end of the first piston 11 and is supported in the first bore section 1a. An annular cup shaped seal member 14 is mounted on the first piston 11 in a fluid tight manner with respect to the second bore section 1b. The annular cup shaped seal member 14 is located adjacent the first land 11a and is able to slide within the second bore section 1b. The second land 11b is slidably disposed in the first bore section 1a and is adapted to contact the second piston 12. The first land 11a and the second land 11b are spaced apart by a predetermined distance.

A cup shaped supporting portion 11s is formed at and extends axially away from the end of the first piston 11 at the first land 11a side of the first piston 11. An axially extending concave or recessed portion 11e is formed in the cylinder body 1h in the end at which is located the supporting portion 11s. An opening 11c is formed in the first piston 11 and extends in the radial direction of the cylinder body 1h. Another opening 1d is formed in the first piston 11 and extends axially along the axis of the cylinder body 1h. These openings 11c, 11d communicate with each other and one end of the axially extending opening 11d communicates with the concave portion 11e.

A retainer 16 is disposed on the supporting portion 11s and a valve body 25 is engaged with the retainer 16. The movement of the valve body 25 with respect to the control piston 21 is regulated by the retainer 16. A valve seat member is fixed to the concave portion 11e of the first piston 11. The valve seat member has a center hole that communicates with the opening 11d and the valve seat member is molded by elastic material. When the first piston 11 and second piston 12 are moved in the rightward direction with reference to the illustration in FIG. 2, the valve body 25 engages the valve seat member and prevents fluid flow communication.

A rod 25b is integrally formed with and extends axially from one end of the valve body 25 and an engaging member 25c is formed at the end of the rod 25b. Further, an axially extending opening 11f is formed at the end of the first land 11a of the first piston 11. The seal member 14 is arranged on the pressure chamber R2 side of the opening 11f and functions as a one-way valve. Therefore, a fluid supply chamber R5 is able to communicate with the pressure chamber R2 by way of the openings 11c, 11d, 11f. The fluid supply chamber R5 communicates with a reservoir tank 6 by way of a fluid path 1e.

The second piston 12 is arranged behind or rearwardly of the first piston 11. A land 12a is formed at the outer surface of the second piston 12 at the left side of the second piston 12 and a seal member 12b is arranged on the land 12a to establish a fluid tight relationship between the second piston 12 and the first bore section 1a. As a result, a power chamber R1 is formed on the side of the seal member 12b opposite the fluid supply chamber R5, with the fluid supply chamber R5 and the power chamber R1 being separated in a fluid tight manner. An axially extending bore 12c is formed at the right side of the second piston 12 and an input member 4 is disposed in the bore 12c.

The input member 4 is screwed to a contact member 5 and the left end side of the second piston 12 faces the right end side of the first piston 11. Thus, the operating force that is applied to the brake pedal 2 is transmitted to the first piston 11 by way of the input member 4 and the contact member 5.

The second piston 12 is supported by a cylindrical sleeve 17. A plurality of annular grooves is formed on the inner and outer surfaces of the sleeve 17 and a seal member 17a, 17b, 18 is disposed in each of the grooves. These seal members 17a, 17b, 18 provide a fluid tight seal between the power chamber R1 and the exterior of the cylinder body 1h. Rather than being separate elements, the first piston 11 and the second piston 12 can be constituted as a single unit.

As mentioned above, the fluid regulator is arranged on the left side of the cylinder body 1h and a supplemental fluid generator 40 is connected to the fluid regulator. The output of the supplemental fluid generator 40 is controlled by the fluid regulator. The supplemental fluid generator 40 is comprised of an electric motor 42, a fluid pump 43 and an accumulator 44. The inlet of the supplemental fluid generator 40 is connected to the reservoir tank 6 and the outlet is connected to the fluid regulator by way of a fluid path 1p.

The pressurized fluid from the supplemental fluid generator 40 is supplied to an opening 31d in a sleeve 31. The control piston 21 that is arranged in the third bore section 1c has lands 21a, 21b that are spaced apart by a predetermined distance as measured along the axis of the cylinder body 1h. A seal member 24 is disposed on the outer surface of the land 21a to establish a fluid tight condition. The land 21b is provided with communication holes so that opposite sides of the land 21b are able to communicate with each other. Therefore, the pressure chamber R2 and a regulator chamber R3, which will be described in more detail below, are divided in a fluid tight manner by the seal member 24. The pressure chamber R2 is formed between the seal member 24 and the seal member 14 that is arranged on the first land 11a of the first piston 11.

As clearly illustrated in FIG. 2, the control piston 21 has an opening 21c that opens at the right side of the control piston 21. A pin 28 is fixed to the cylinder body 1h to prevent movement of the control piston 21 in the rightward direction. In this embodiment, the control piston 21 is allowed to move only in the leftward direction.

The control piston 21 has a supporting portion 21s that extends axially with respect to the axis of the cylinder body 1h. The engage member 25c of the valve body 25 is arranged in the opening 21c of the control piston 21. A retainer 26 is disposed on the supporting portion 21s of the control piston 21 and the engage member 25c engages the retainer 26. The movement of the valve body 25 in a direction towards the master cylinder piston 10 is regulated by this engagement.

A spring 19 is disposed between the retainer 26 and the retainer 16, and applies a predetermined compression force. When the brake operating force is not applied to the brake pedal 2, the valve body 25 contacts the retainer 16 and the movement of the control piston 21 is regulated by the engagement between the retainer 26 and the engaging member 25c by the compression force that is generated by the spring 19. As a result, the valve body 25 moves away from the valve seat, and the opening 11d and the pressure chamber R2 communicate with each other. Further, a blind bore or concave is formed in the left end of the control piston 21, and a spool 32 is arranged and supported in the bore in the control piston 21.

In the third bore section 1c that communicates with the second bore section 1b, a cylindrical sleeve 31 and an adjusting member 36 are arranged. The regulator chamber R3 is formed between the sleeve 31 and the control piston 21. A plurality of annular grooves are formed on the outer surface of the sleeve 31 and the adjusting member 36, and respective seal members are arranged in the grooves. The opening 31d and another opening 31f are formed in the sleeve 31 and extend in the radial direction of the sleeve 31. A further radially extending opening 36b is formed in the adjusting member 36. The spool 32 is slidably arranged within the sleeve 31, with the opening and closing of the opening 31f being controlled in response to the movement of the spool 32.

An opening 31e is formed in the sleeve 31 and extends generally parallel to the axis of the cylinder body 1h. The opening 31f and the regulator chamber R3 communicate with each other by way of the opening 31e. When the opening 31f is opened, the regulator chamber R3 and a fluid path 1s that communicates with reservoir tank 6 communicate with each other by way of the openings 31e, 31f.

The one end of the opening 31d is communicated with the supplemental fluid generator 40 by way of the fluid path 1p. However, as shown in FIG. 2, the other end of the opening 31d is shut by the outer surface of the spool 32. An annular groove 31c is formed on the inner surface of the sleeve 31. The opening 36b is communicated with a fluid path 1q.

A plunger 35 is fixed to the left side of the spool 32. The right side of the spool 32 is located in the regulator chamber R3 and is supported by the control piston 21. A retainer 33 is arranged in the blind bore in the left side of the control piston 21, and a spring 34 is disposed between the retainer 33 and the sleeve 31 to apply a predetermined compression force. The compression force which is generated by the spring 34 is smaller than the compression force generated by the spring 19. The compression force generated by the spring 34 has sufficient force so that the first and second pistons 11, 12 and the control piston 21 are able to slide.

At the initial position of the spool 32, the regulator chamber R3 and the reservoir tank 6 communicate with each other by way of the openings 31e, 31f and the fluid path 1s. An outwardly facing groove 32b which faces the regulator chamber R3 is formed on the outer surface of the spool 32. Also, another outwardly facing groove 32c is formed on the outer surface of the spool 32 at a position adjacent to the groove 32b. The groove 32b faces the groove 31c that is formed on the inner surface of the sleeve 31.

As shown in FIG. 2 which illustrates the non-operating condition, the regulator chamber R3 communicate with the reservoir tank 6 by way of the openings 31e, 31f and the fluid path 1s having the atmospheric pressure condition. When an operating force is applied to the brake pedal 2, the control piston 21 moves in the leftward direction with respect to the illustration in FIG. 2. In response to the movement of the control piston 21, the spool 32 also moves in the leftward direction. As a result, the opening 31f is shut by the movement of the spool 32 and the communication between the regulator chamber R3 and the reservoir tank 6 is interrupted. According to this movement, the opening 31d faces the groove 32c of the spool 32 and the groove 31c and the groove 32b communicate with each other. Therefore, the regulator chamber R3 communicates with the supplemental fluid generator 40. As a result, pressurized fluid from the supplemental fluid generator 40 is introduced into the regulator chamber R3 and the pressure in the regulator chamber R3 rises. The sleeve 31 and the spool 32 define a normally closed type pressure increase valve which controls communication between the supplemental fluid generator 40 and the regulator chamber R3 and also defines a normally open type pressure release valve which controls communication between the regulator chamber R3 and the reservoir tank 6.

The adjusting member 36 possesses a bore having a stepped configuration. A transmission member 37 is slidably arranged in the smaller diameter portion of the bore in the adjusting member 36. The right side of the transmission member 37 faces the plunger 35, and the transmission member 37 functions as a second repulsion generating member. An elastic member 38 is disposed in the larger diameter portion of the bore of the adjusting member 36, and the elastic member 38 functions as a regulating member. The tip portion of the transmission member 37 provided at the left side of the transmission member 37 is adapted to engage the elastic member 38. In this embodiment, a truncated cone shaped contacting member is disposed on the tip of the transmission member 37. However, the truncated cone shaped member can be formed as one body with the contacting member. A plug 39 is disposed within the adjusting member 36 and a regulator chamber R4 is formed between the plug 39 and the elastic member 38.

The regulator chamber R4 communicates with the pressure chamber R2 by way of the opening 36b and the fluid paths 1q, 1n. Also, the pressure chamber R2 communicates with the wheel cylinder Wfr by way of the fluid path 1n, and the power chamber R1 communicates with the wheel cylinder Wrr by way of a fluid path 1k.

As seen with reference to the illustration in FIG. 1 which is an enlarged view of the fluid regulator, the spool 32 has a main body possessing a diameter Ds and a large diameter portion 32e possessing a diameter Dc. The relationship between these two diameters is Dc>Ds. The large diameter portion 32e is adapted to engage the control piston 21, and contacts the control piston 21 by way of the retainer 33 through the compression force of the spring 34. If pressurized fluid is introduced into the regulator chamber R3, the large diameter portion 32e pushes the control piston 21. The sleeve 31 has a large diameter portion on one side of the opening 31d that possesses a diameter Da and a small diameter portion on the opposite side of the opening 31d that possesses a diameter Db. The relationship between these diameters is Da>Db. When pressurized fluid is introduced from the supplemental fluid generator 40 to a location between the large and small diameter portions of the sleeve 31, the sleeve 31 pushes the adjusting member 36.

As mentioned above, the adjusting member 36 is cylindrically shaped and the transmission member 37 is slidably arranged in the bore provided in the adjusting member 36. The elastic member 38 is arranged in the step shaped inner bore of the adjusting member 36 and the right side of the transmission member 37 faces the plunger 35. When fluid pressure in the pressure chamber R2 is introduced into the regulator chamber R4 and the operating force that is applied to the brake pedal 2 is within a predetermined value, the elastic member 38 is not deformed (i.e., is not deformed in rightward direction) by the fluid pressure from the master cylinder. The fluid pressure which is generated in the master cylinder is not transmitted to the transmission member 37. If the operating force that is applied to the brake pedal 2 exceeds the predetermined value, the elastic member 38 is deformed in the rightward direction and the fluid pressure that is generated by the master cylinder is transmitted to the transmission member 37. As a result, the spool 32 slides in the rightward direction and the fluid pressure in the regulator chamber R3 is released.

A clearance St between the opening 31d and the groove 32c determines an initial play of the brake pedal operation. The clearance St also determines the region in which the fluid flow from the supplemental fluid generator 40 to the groove 32c is permitted or not. The clearance St should be determined precisely to establish certain operation of the brake fluid pressure generating device. In this embodiment, the spool 32 is supported by the control piston 21 and the adjusting member 36 faces to the left side of the spool 32. Furthermore, the adjusting member 36 engages the left end of the sleeve 31 and the clearance between the adjusting member 36 and the spool 32 is adjusted by the movement of the adjusting member 36. Therefore, when the adjusting member 36 is mounted in the cylinder body 1h and slides in the rightward direction, the adjusting member 36 engages the sleeve 31. When the adjusting member 36 and the sleeve 31 are engaged, the predetermined distance L between the elastic member 38 and the tip of the plunger 35 is defined. The position of the sleeve 31 against the spool 32 is precisely defined by sliding adjustment. The seal members arranged on the outer surface of the sleeve 31 produce a fluid tight arrangement.

A space 50 is defined between the inner surface of the bore in the cylinder body 1h and the outer surface of the sleeve 31. When pressurized fluid from the supplemental fluid generator 40 is introduced into the space 50, the spool 31 is pushed in the direction of the adjusting member 36 because of the difference in diameter between Db and Da. By using this pressure, the sleeve 31 keeps the initial position.

The operation and function of the brake fluid pressure device according to the present invention is as follows. FIGS. 1 and 2 illustrate the brake fluid pressure device in the condition in which an operating force is not applied to the brake pedal 2. When an operating force is applied to the brake pedal 2, the push rod 3, the input member 4, the contact member 5, the first piston 11 and the second piston 12 move in the leftward direction. In accordance with this movement, the valve body 25 is seated on the valve seat member and communication between the pressure chamber R2 and the fluid supply chamber R5 is interrupted. If further operating force is applied to the brake pedal 2, the first and second pistons 11,12 and the control piston 21 move together. Under this condition, the distance between the first piston 11 and the control piston 21 is maintained by the spring 19.

In accordance with the leftward movement of the control piston 21, the spool 32 slides and covers the opening 31f, thus interrupting communication between the regulator chamber R3 and the reservoir tank 6. Pressurized fluid from the supplemental fluid generator 40 is then supplied to the regulator chamber R3 by way of the fluid path 1p, the opening 31d, and the grooves 31c, 32c, 32b. The fluid pressure in the regulator chamber R3 is further applied to the power chamber R1 by way of a fluid path 1r. The first and second pistons 11, 12 are driven by the fluid pressure in the power chamber R1 and further move in the leftward direction. In response to this movement, the volume in the pressure chamber R2 is decreased and the fluid pressure that is generated in the pressure chamber R2 is applied to the wheel cylinder Wfr by way of the fluid path 1n as a master cylinder fluid pressure. On the other hand, the fluid pressure in the power chamber R1 is applied to the wheel cylinder Wrr by way of the fluid path 1k as a regulator fluid pressure. The master cylinder fluid pressure is applied to the regulator chamber R4 by way of the fluid paths 1n, 1q.

While the operating force to the brake pedal 2 is within the predetermined value and the pressure value in the regulator chamber R3 is greater than the pressure value in the pressure chamber R2, the control piston 21 moves in the rightward direction. As a result, communication between the regulator chamber R3 and the reservoir tank 6 is established and the fluid pressure in the regulator chamber R3 is released. On the other hand, with the pressure value in the regulator chamber R3 smaller than the pressure value in the pressure chamber R2, the control piston 21 moves in the leftward direction and the spool 32 slides so as to cover the opening 31f. The regulator chamber R3 thus communicates with the supplemental fluid pressure generator 40 instead of the reservoir tank 6 and the fluid pressure value in the regulator chamber R3 rises. In response to the movement of the spool 32, the pressure difference between the pressure chamber R2 and the regulator chamber R3 is adjusted. Therefore, a first brake fluid pressure characteristic (the regulator fluid pressure) that is in proportion to the operation of the brake pedal 2 is generated.

Figure 3:
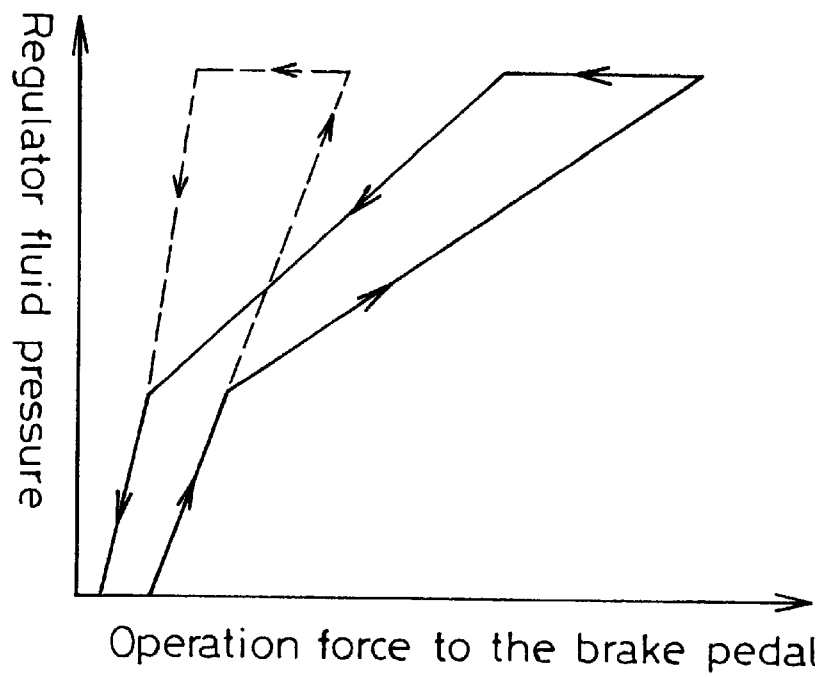
FIG. 3 is a characteristic curve illustrating the relationship between the brake pedal operation force and regulator fluid pressure associated with operation of the brake fluid pressure generating device of the present invention.

If further operating force is applied to the brake pedal 2 and exceeds the predetermined level, the elastic member 38 deforms in the rightward direction in response to the fluid pressure that is applied to the regulator chamber R4 from the pressure chamber R2. With this deformation, the elastic member 38 drives the transmission member 37 and the spool 32 in the rightward direction. By virtue of this movement, communication between the regulator chamber R3 and the reservoir tank 6 is reestablished by way of the opening 31f. Consequently, the fluid pressure in the regulator chamber R3 is released. Therefore, a second brake fluid pressure characteristic that is in proportion to the operation of the brake pedal 2 is generated. However, the second brake fluid pressure characteristic has a gentle pressure rise slope. FIG. 3 shows a hysteresis characteristic curve illustrating the relationship between the operation force applied to the brake pedal 2 and the regulator fluid pressure.

The foregoing second brake fluid pressure characteristic is determined in accordance with the diameter De of the transmission member 37 and other factors (e.g. the tip shape of the transmission member, the weight of the transmission member material, etc). Different characteristics might be produced by using a different diameter transmission member 37, or using different materials having different elastic characteristics to fabricate the elastic member 38. The different pressure characteristics can be obtained without any changes in the sleeve 31.

Under the condition that the master cylinder is not able to generate the master cylinder fluid pressure, the fluid pressure applied to the wheel cylinder Wfr is interrupted. Under this condition, if the master cylinder fluid pressure is generated in accordance with the solid line of FIG. 3, the braking force that is generated in the wheel cylinder significantly decreases. When the master cylinder is damaged or non-operational, the master cylinder fluid pressure is not supplied to the regulator chamber R4 and the spool 32 is not moved. Based on this operation, the master cylinder produces a characteristic represented by the dotted line in FIG. 2. Therefore, powerful regulator pressure is supplied to the wheel cylinder Wrr with a small operating force to the brake pedal 2. Consequently, an appropriate braking force is generated by this brake fluid pressure generating device.

Figure 5:
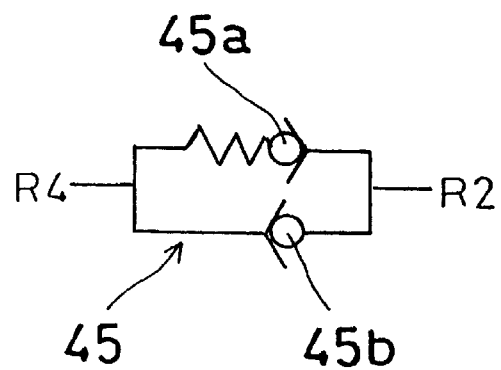
FIG. 5 is a schematic illustration of the valve mechanism that is used in the brake fluid pressure generating device shown in FIG. 4.

FIG. 4 shows an another embodiment of the brake fluid pressure generating device according to the present invention. In this embodiment, the fluid pressure in the regulator chamber R4 is directly transmitted to the transmission member 37. A valve mechanism 45 is disposed between the pressure chamber R2 and the regulator chamber R4. The valve mechanism 45 functions as a regulating mechanism. As shown in FIG. 5, the valve mechanism 45 is comprised of a differential pressure valve 45a and a one way valve 45b. These two valves 45a, 45b are connected in parallel. The differential pressure valve 45a decreases the pressure from the pressure chamber R2 and applies this pressure to the regulator chamber R4. The amount of reduction produced by the differential pressure valve 45a is the same pressure in the regulator chamber R4 when the elastic member 38 is deformed.

In the foregoing two embodiments, the normally open type pressure release valve and the normally closed type pressure increase valve are composed of a sleeve 31 and a spool 32. However, a poppet valve may be employed instead.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A brake fluid pressure generating device for a vehicle provided with a brake operation member, comprising:
   a cylinder body provided with a bore;
   a master cylinder including a master cylinder piston slidably disposed in the bore;
   a reservoir;
   a supplemental fluid generator for generating a power fluid pressure;
   a fluid regulator for regulating said power fluid pressure to a regulated fluid pressure in response to operation of the brake operation member, said fluid regulator including a first regulator chamber and a second regulator chamber that are separated in a fluid tight manner from one another, said fluid regulator including a valve positionable in a first position in which the first regulator chamber communicates with the reservoir and a second position in which the first regulator chamber communicates with the supplemental fluid generator;
   a pressure chamber in the bore between the master cylinder piston and the fluid regulator;
   said pressure chamber being fluidly communicated with the second regulator chamber to control movement of said valve from said second position to said first position upon application of a predetermined force to the brake operation member.

2. The brake fluid pressure generating device for a vehicle as set forth in claim 1, including a deformable elastic member disposed adjacent the second regulator chamber and a transmission member disposed adjacent the elastic member, said elastic member being deformed by fluid pressure supplied to the second regulator chamber and engaging the transmission member which urges the valve to the first position.

3. The brake fluid pressure generating device for a vehicle as set forth in claim 1, wherein said valve includes a spool slidably disposed within a sleeve.

4. The brake fluid pressure generating device for a vehicle as set forth in claim 1, wherein said master cylinder piston includes a first piston and a second piston.

5. The brake fluid pressure generating device for a vehicle as set forth in claim 4, wherein said fluid regulator includes a control piston connected to the second piston by a rod.

6. A brake fluid pressure generating device for a vehicle comprising:
   a master cylinder for generating a fluid pressure corresponding to operation of a brake operation member, the master cylinder including a master cylinder piston slidably disposed in a cylinder body and a pressure chamber formed in front of the master cylinder piston;
   a supplemental fluid generator generating a master cylinder power fluid pressure;
   a fluid regulator regulating the power fluid pressure corresponding to operation of the brake operation member and introducing a regulated fluid pressure into a first regulator chamber, the fluid regulator including:
      a regulator valve member which permits fluid communication of the first regulator chamber with the supplemental fluid generator while preventing fluid communication of the first regulator chamber with a reservoir tank when one end of the regulator valve member receives the master cylinder fluid pressure in the pressure chamber, and which permits fluid communication of the first regulator chamber with the reservoir tank while preventing fluid communication of the first regulator chamber with the supplemental fluid generator when the regulator valve member receives the regulated fluid pressure in the first regulated chamber; and
   the pressure chamber being fluidly communicated with a second regulator chamber to permit fluid communication of the first regulator chamber with the reservoir tank while preventing fluid communication of the first regulator chamber with the supplemental fluid generator upon application of a predetermined force to the brake operation member.

7. The brake fluid pressure generating device for a vehicle as set forth in claim 6, further including a first repulsion force generating member that is controlled in response to the regulated fluid pressure, a second repulsion force generating member that is controlled in response to the master cylinder fluid pressure, said fluid regulator prohibiting application of said master cylinder fluid pressure to said second repulsion force generating member when an operating force applied to the brake operation member is within a predetermined value.

8. The brake fluid pressure generating device for a vehicle as set forth in claim 7, wherein said fluid regulator includes an elastic member.

9. A brake fluid pressure generating device for a vehicle comprising:
   a master cylinder for generating a master cylinder fluid pressure corresponding to operation of a brake operation member, the master cylinder including a master cylinder piston slidably disposed in a cylinder body and a pressure chamber formed in front of the master cylinder piston;
   a supplemental fluid generator generating a power fluid pressure;
   a fluid regulator regulating the power fluid pressure corresponding to operation of the brake operation member, said fluid regulator including a first regulator chamber and a second regulator chamber that are separated in a fluid tight manner from one another, the fluid regulator including:

a regulator valve member which controls fluid communication of the first regulator chamber with a reservoir and the supplemental fluid generator based on a pressure differential between the first regulator chamber and the pressure chamber; and the pressure chamber being fluidly communicated with the second regulator chamber to permit fluid communication of the first regulator chamber with the reservoir while preventing fluid communication of the first regulator chamber with the supplemental fluid generator upon application of a predetermined force to the brake operation member.

10. The brake fluid pressure generating device for a vehicle as set forth in claim 9, further including a first repulsion force generating member controlled in response to regulated fluid pressure regulated by the fluid regulator and a second repulsion force generating member controlled in response to the master cylinder fluid pressure, said fluid regulator prohibiting application of said fluid pressure produced by the master cylinder to said second repulsion force generating member when an operating force applied to the brake operation member is within a predetermined value.

* * * * *